United States Patent
Pourchet et al.

(10) Patent No.: US 10,931,172 B2
(45) Date of Patent: Feb. 23, 2021

(54) COOLED HOUSING FOR THE STATOR OF A DIRECT DRIVE

(71) Applicant: ETEL S.A., Môtiers (CH)

(72) Inventors: Johann Pourchet, La Chaux de Gilley (FR); Dmitry Chechenev, Neuchâtel (CH); Christian Locatelli, Neuchâtel (CH); Wojciech Zak, Neuchâtel (CH); Julien Guidot, Arcon (FR)

(73) Assignee: ETEL S.A., Môtiers (DE)

( * ) Notice: Subject to any disclaimer, the term of this patent is extended or adjusted under 35 U.S.C. 154(b) by 264 days.

(21) Appl. No.: 16/177,806

(22) Filed: Nov. 1, 2018

(65) Prior Publication Data

US 2019/0140519 A1  May 9, 2019

(30) Foreign Application Priority Data

Nov. 3, 2017 (EP) .................................. 17199873

(51) Int. Cl.
| | |
|---|---|
| *H02K 9/193* | (2006.01) |
| *H02K 5/20* | (2006.01) |
| *H02K 1/20* | (2006.01) |
| *H02K 15/02* | (2006.01) |
| *H02K 21/14* | (2006.01) |
| *H02K 9/19* | (2006.01) |

(52) U.S. Cl.
CPC .............. *H02K 9/193* (2013.01); *H02K 1/20* (2013.01); *H02K 5/20* (2013.01); *H02K 9/19* (2013.01); *H02K 15/02* (2013.01); *H02K 21/14* (2013.01); *H02K 2209/00* (2013.01)

(58) Field of Classification Search
CPC .................................. H02K 9/193; H02K 1/20
See application file for complete search history.

(56) References Cited

U.S. PATENT DOCUMENTS

| | | | | |
|---|---|---|---|---|
| 3,601,884 A * | 8/1971 | Kemeny | .................. | F28F 7/00 228/160 |
| 4,516,044 A * | 5/1985 | Bone | ........................ | H02K 9/19 165/169 |
| 4,959,570 A * | 9/1990 | Nakamura | ................ | H02K 9/20 310/54 |
| 5,642,013 A | 6/1997 | Wavre | | |
| 6,909,210 B1 * | 6/2005 | Bostwick | ................. | H02K 5/20 310/254.1 |
| 7,009,317 B2 * | 3/2006 | Cronin | ..................... | H02K 5/20 310/52 |
| 7,322,103 B2 * | 1/2008 | Burjes | ....................... | F28F 3/12 29/890.035 |

(Continued)

FOREIGN PATENT DOCUMENTS

| | | |
|---|---|---|
| DE | 102009031727 A1 | 2/2010 |
| EP | 2680408 B1 | 1/2014 |
| JP | 2013-135567 A | 7/2013 |

*Primary Examiner* — Robert W Horn
(74) *Attorney, Agent, or Firm* — Carter DeLuca & Farrell LLP

(57) ABSTRACT

In a cooled housing for the stator of a direct drive, cooling ducts extend on an outer peripheral surface of the housing, the cooling ducts being sealed by an annular cover extending around the peripheral surface. The cover includes openings as an inlet and outlet for a cooling medium, and the cover is arranged such that sections of the peripheral surface of the housing remain free.

19 Claims, 4 Drawing Sheets

(56) References Cited

U.S. PATENT DOCUMENTS

| | | | |
|---|---|---|---|
| 7,591,147 B2* | 9/2009 | Masoudipour | F25B 31/006 165/169 |
| 7,626,292 B2* | 12/2009 | Baumann | H02K 5/20 165/156 |
| D624,015 S * | 9/2010 | Walker | D13/112 |
| 7,965,002 B2* | 6/2011 | Savant | H02K 5/20 310/52 |
| 8,183,723 B2* | 5/2012 | Fee | H02K 5/20 310/54 |
| 8,487,489 B2* | 7/2013 | Palafox | H02K 3/24 310/52 |
| 8,629,587 B2* | 1/2014 | Kao | H02K 5/20 310/54 |
| 9,065,312 B2* | 6/2015 | Fernandes Goncalves | H02K 5/20 |
| 9,209,661 B2* | 12/2015 | Dragon | H02K 5/20 |
| 9,525,325 B2* | 12/2016 | Chamberlin | H02K 9/19 |
| 9,929,626 B2* | 3/2018 | Hyun | H02K 5/20 |
| 10,224,785 B2* | 3/2019 | Weis | H02K 5/20 |
| 2007/0075595 A1* | 4/2007 | Narayanan | H02K 15/14 310/52 |
| 2008/0001487 A1* | 1/2008 | Wei | H02K 1/20 310/54 |
| 2010/0001597 A1* | 1/2010 | Noll | H02K 5/20 310/58 |
| 2011/0101802 A1* | 5/2011 | Hennings | H02K 5/20 310/58 |
| 2011/0227446 A1 | 9/2011 | Vedy | |
| 2013/0169077 A1 | 7/2013 | Takei | |
| 2014/0246933 A1* | 9/2014 | Chamberlin | H02K 9/19 310/54 |
| 2019/0140519 A1* | 5/2019 | Pourchet | H02K 9/19 |
| 2020/0153292 A1* | 5/2020 | Yokota | H02K 1/185 |

\* cited by examiner

COOLED HOUSING FOR THE STATOR OF A DIRECT DRIVE

CROSS-REFERENCE TO RELATED APPLICATIONS

The present application claims priority to Application No. 17199873.5, filed in the European Patent Office on Nov. 3, 2017, which is expressly incorporated herein in its entirety by reference thereto.

FIELD OF THE INVENTION

The present invention relates to a cooled housing for the stator of a direct drive.

Such direct drives are intended for generating a high torque also at low rotational frequencies or even during a standstill. Cooling by a ventilator mounted on the shaft of the drive is therefore not an option. Instead, such drives are frequently cooled via cooling ducts in the region of the stator.

BACKGROUND INFORMATION

Direct drives, and in particular synchronous motors that deliver torque to an application without an interconnected transmission are described, for example, in U.S. Pat. No. 5,642,013. FIG. 15 shows a rotary motor. A rotor fitted with magnets (secondary component) rotates within a stator (primary component) fitted with coils. The detent forces that occur in the process are able to be kept low by a suitable arrangement of the coils and magnets. In order to generate high torque, high currents selectively flow in the coils, which locally lead to significant heat input at low rotational frequencies or even during a standstill. The cooling of such motors is therefore important.

In this context, European Patent No. 2 680 408 describes a housing for such a synchronous motor, on whose outer peripheral surface cooling ducts extend, which are sealed by a thin sheet metal plate on the peripheral surface of the housing. An axial supply of a cooling medium is provided directly in the housing. The sheet metal plate is welded to the housing in order to seal the cooling ducts. In other words, the housing of this motor must be prepared for the special variant of the cooling. This configuration is also referred to as closed cooling since the cooling circuit is closed and sealed even before the motor is installed in an application. It is not possible to use this motor also in a conventional arrangement in which a sealing of the circumferential cooling ducts is accomplished only by the installation in a mount for the motor that is made available by the user of the motor. This configuration is also referred to as open cooling and is sometimes preferred because the peripheral surface of the housing, which is already very accurately machined at least in sections for sealing purposes, can also be used for the precise alignment of the drive. In the closed-cooling configuration, this precisely machined section is not accessible.

In conventional systems, it is necessary to make different housing arrangements available for such direct drives in order to allow the drives to be offered both for closed- and open-cooling configurations.

SUMMARY

Example embodiments of the present invention provide a cooled housing for the stator of a direct drive in which the housing is suitable both for closed and open cooling and in which sections of the peripheral surface of the housing that are used as a positional reference remain accessible even in the case of closed cooling.

According to an example embodiment of the present invention, a cooled housing for the stator of a direct drive is provided on which cooling ducts extend on an outer peripheral surface of the housing, which are sealed by an annular cover disposed on the peripheral surface. The cover has openings as an inlet and outlet for a cooling medium. In addition, the cover is arranged such that sections of the peripheral surface of the housing remain free.

The cover may be shorter than the housing in the axial direction and may be disposed on the housing in a centered manner, so that sections of the peripheral surface of the housing at both ends of the housing that may be used as a reference during the installation of the motor into an application remain accessible. As a result, it is possible to offer the housing or the entire motor both in a variant featuring closed cooling and in a variant featuring open cooling, without the need to stock different housing variants to be able to do so. For the closed-cooling variant, the cover is attached to the housing in a shrink-fitting process, in which case O-rings in the region of the edges of the cover provide the sealing. Without a separate cover, the motor is also installable in a corresponding mount of a customer application, in which case this mount then assumes the function of the cover.

In addition, a connection piece may be provided, which is able to be screwed to the cover and through which a radial, axial and also a tangential supply of the coolant may optionally take place.

The configuration of the housing makes it possible to construct a drive featuring closed cooling on the basis of a housing for the open-cooling configuration, without requiring a modified housing for this purpose. The option, and advantages, of the open cooling remain. As a result, it is possible to use a stator, produced as a stocked product, both for the open-cooling variant and for the closed-cooling variant. In the latter case, a cover is shrink-fitted in a matter of minutes and checked for tightness. This flexibility considerably reduces the time and labor involved in the production process and also the stock-keeping expense.

Additional features and aspects of example embodiments of the present invention are described in more detail below with reference to the appended Figures.

DETAILED DESCRIPTION

Figure 1:
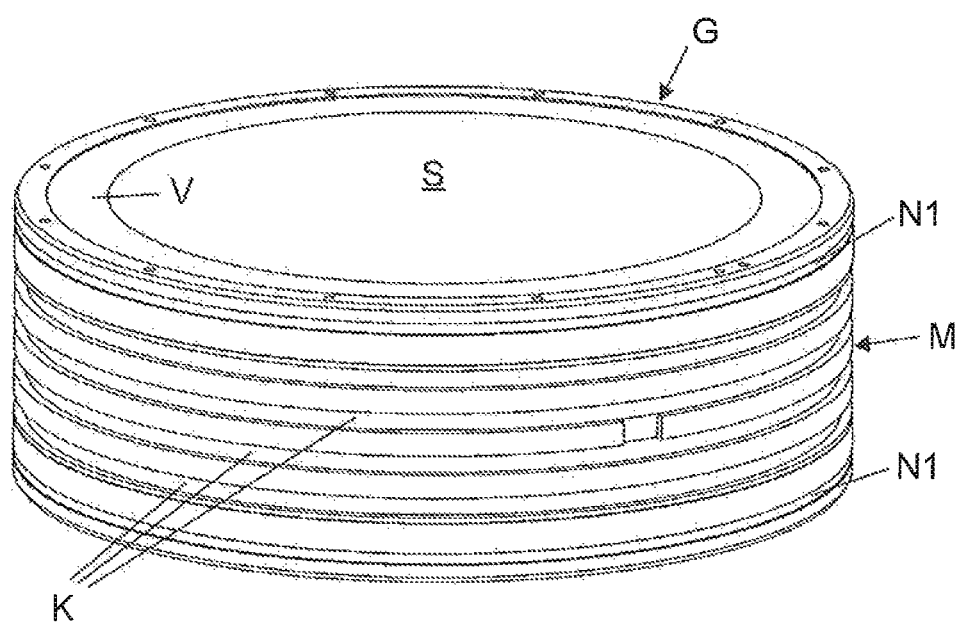
FIG. 1 is a perspective view the stator of a direct drive including a housing.

FIG. 1 schematically illustrates a stator S of a synchronous motor, which is arranged inside a housing G. The coils of stator S point toward the center of stator S and are encased in a sealing compound V. A rotor is provided in the interior of stator S and magnets are fastened to its external periphery. Using a suitable energization of the coils, it is possible to set the rotor into a rotary motion, or to apply a torque. Provided on outer peripheral surface M of housing G are cooling ducts K, which are restricted to a central region. Circumferential grooves N1 for the accommodation of sealing rings are introduced into an outer region of peripheral surface M, in close proximity to the two end faces of housing G.

The two outer regions of peripheral surface M, which also include circumferential grooves N1, are machined in a particularly precise manner. On the one hand, these regions are meant to prevent the leakage of coolant, either with the aid of a separate cover or by a corresponding application-side mount, and on the other hand, these particularly precisely machined sections are also used as a mechanical reference for the installation of the drive.

Housing G illustrated in FIG. 1 may be used both for the closed-cooling and for the open-cooling configurations. The further features required for the closed-cooling configuration are described below.

Figure 2:
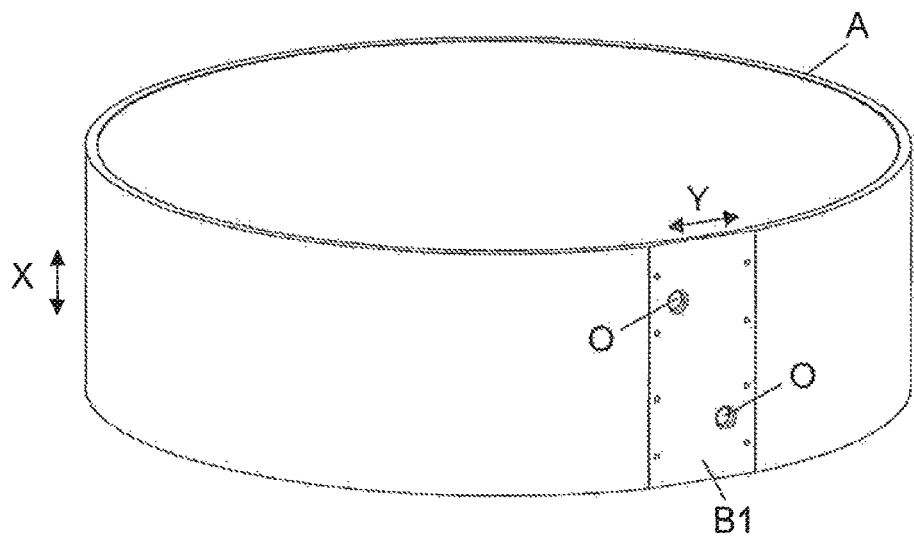
FIG. 2 is a perspective view of a cover for the housing illustrated in FIG. 1.
Figure 3:
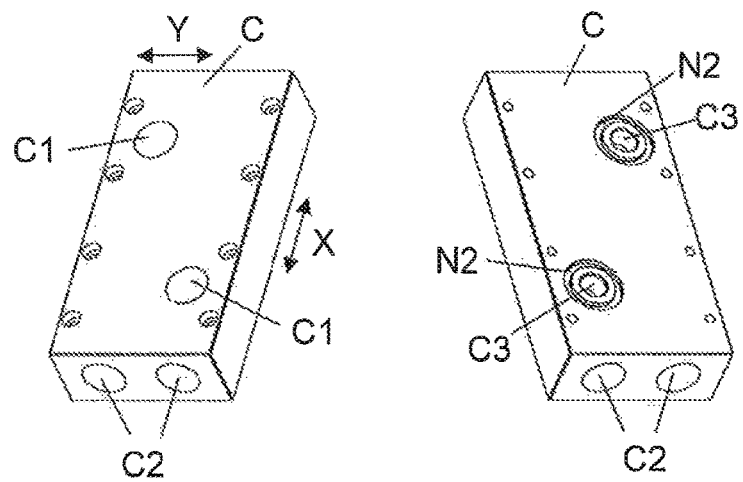
FIG. 3 illustrates a suitable connection piece in different views.
Figure 4:
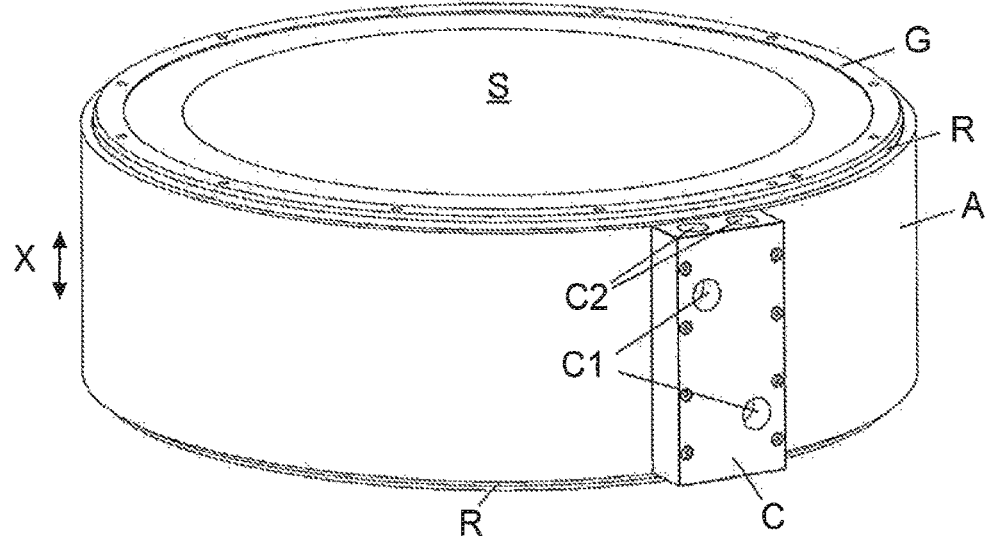
FIG. 4 is a perspective view of the stator with closed cooling, in the assembled state.

A first exemplary embodiment is illustrated in FIGS. 2 to 4. FIG. 2 is a perspective view of an annular or cylindrical envelope or cover A, which is mounted on housing G illustrated in FIG. 1 with the aid of a shrink-fitting process, for example. Cover A has on its outer side a flat, non-curved region B1, which is able to be milled after a lathing process for producing cover A. Two openings O are located above one of cooling ducts K in each case, so that coolant (e.g., 30% glycol in water) is able to be supplied to or from these openings O. Cover A, which is made from steel, for example, may have a thickness of approximately 5 mm to 8 mm in order to be stable enough on the one hand, and not to introduce too much additional weight on the other hand and also in order not to take up unnecessary additional space. In addition, cover A has threaded holes for fastening a connection piece.

FIG. 3 schematically illustrates such a connection piece C in two different views. The connection piece C is provided to be placed on flat region B1 of cover A and to be screwed to it. Connection piece C has two radial threaded holes C1 and two axial threaded holes C2. One of the two pairs is able to be connected to connection tubes for coolant, and the other pair, which is not needed, may be sealed. Threaded holes C1, C2 are connected to additional openings C3 in connection piece C, which correspond to openings O of cover A. Additional openings C3 are each surrounded by a groove N2 into which the sealing rings may be inserted. It is also possible to use connection pieces C that have only one pair of threaded holes C1 or C2. However, the arrangement including axial and radial threaded holes C1, C2 is able to be used in a more flexible manner.

FIG. 4 is a perspective view of housing G together with cover A and connection piece C in the assembled state. For this purpose, connection piece C is screwed to flat region B1 of cover A after cover A has been shrink-fitted onto housing G. As illustrated in FIG. 4, the axial length of cover A (i.e., in direction X) is smaller than the corresponding length of housing G. Sections R of peripheral surface M of housing G are therefore not covered by cover A and thus are accessible for the assembly of the drive. In axial direction X, these sections R should have a width of at least 2 mm.

Figure 5:
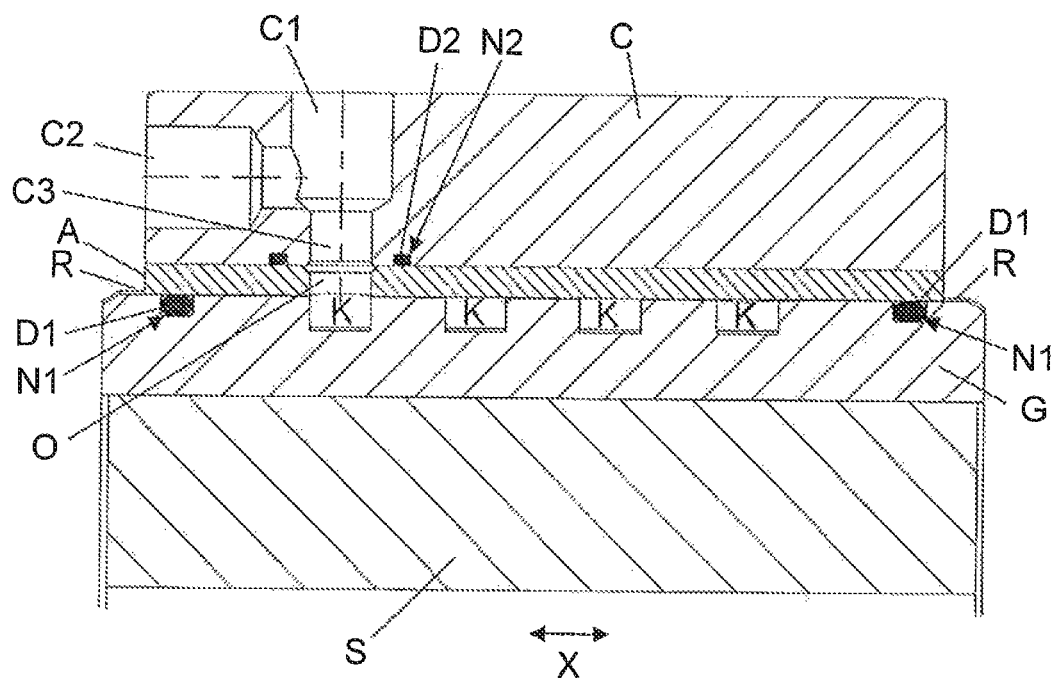
FIG. 5 is a cross-sectional view of the assembled stator.
Figure 6:
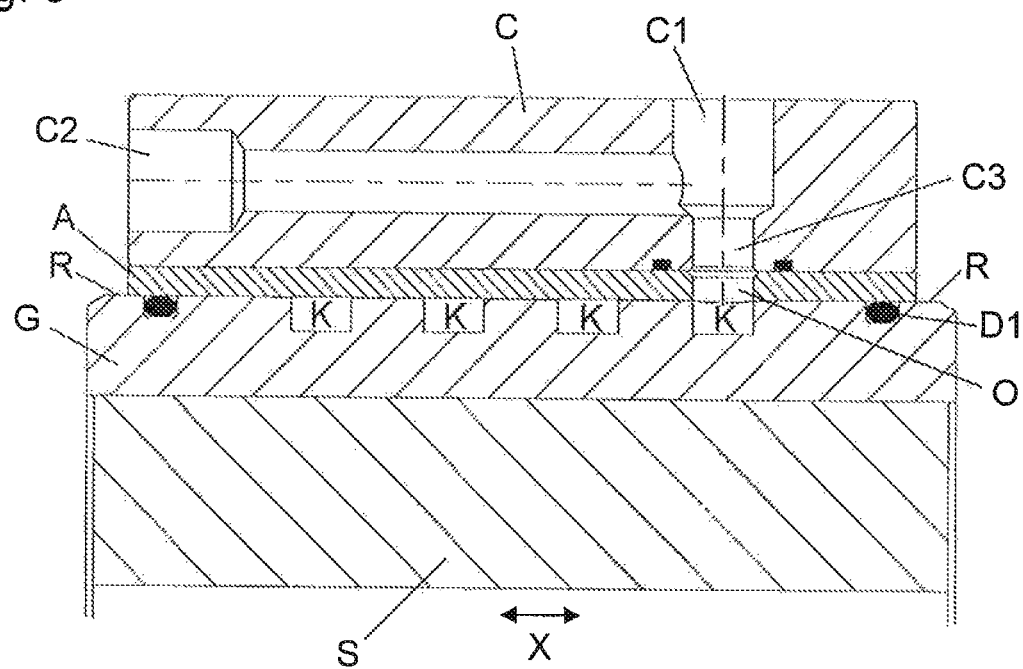
FIG. 6 is another cross-sectional view of the assembled stator.

FIGS. 5 and 6 are cross-sectional views through stator S, housing G, and its cover A, required for the closed cooling, including connection piece C.

As illustrated, one of radial threaded holes C1 and one of axial threaded holes C2 are connected to one of additional openings C3 in each case, these additional openings C3 of connection piece C corresponding to openings O of cover A and cooling ducts K located underneath. To make this arrangement possible, openings O are placed at a mutual offset both in axial direction X and in tangential direction Y in each case. The axial offset can be seen by comparing FIGS. 5 and 6, and the tangential offset is illustrated in FIG. 2.

As illustrated in FIGS. 5 and 6, sections R are not covered by cover A so that these particularly precisely machined sections R are accessible for the installation of the motor in an application. The region featuring the particularly precise machining (e.g., Ra 1.6 µm and a high demand on the size accuracy) extends to below cover A and also includes grooves N1 into which sealing rings D1 are placed. The machining is less precise in the center region of housing G (e.g., Ra 3.2 µm and a reduced demand on the size accuracy) because sealing of cooling ducts K by cover A among one another is neither necessary nor desired. Because of coolant that flows from a cooling duct K across the separating web and into next cooling duct K, the web between these ducts K is also cooled in a more optimal manner. A gap of 0.1 mm to 0.2 mm may be provided between the webs and cover A. This path of the coolant also contributes to the pressure drop between the inlet and outlet of the coolant. This pressure drop amounts to, for example, between 1 bar and 5 bar, depending on the size of the motor.

Additional openings C3 of connection piece C are also sealed by sealing rings D2, which are inserted into grooves N2. They are easily exchangeable after connection piece C is disassembled.

Figure 7:
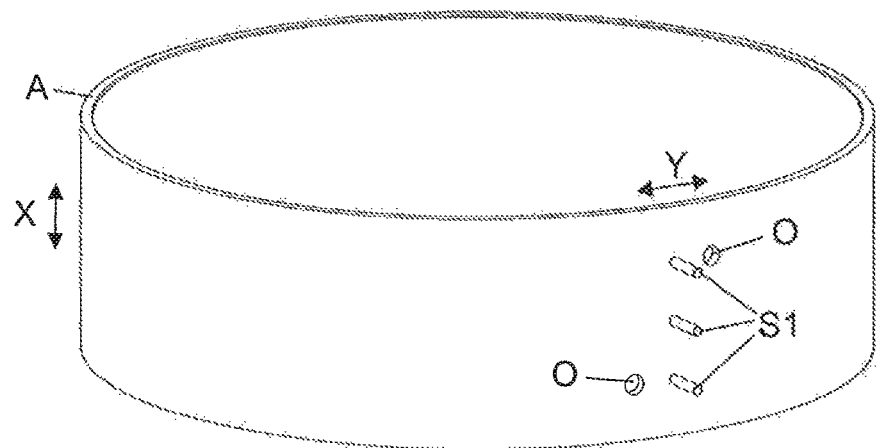
FIG. 7 is a perspective view of a cover for the housing.
Figure 8:
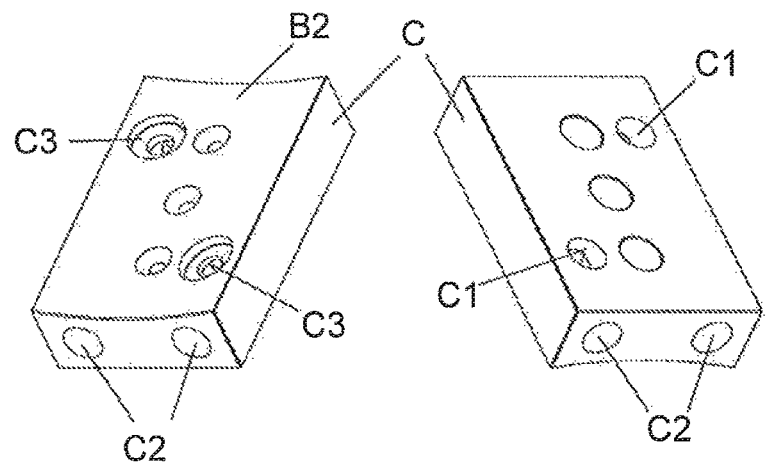
FIG. 8 illustrates a suitable connection piece in different views.
Figure 9:
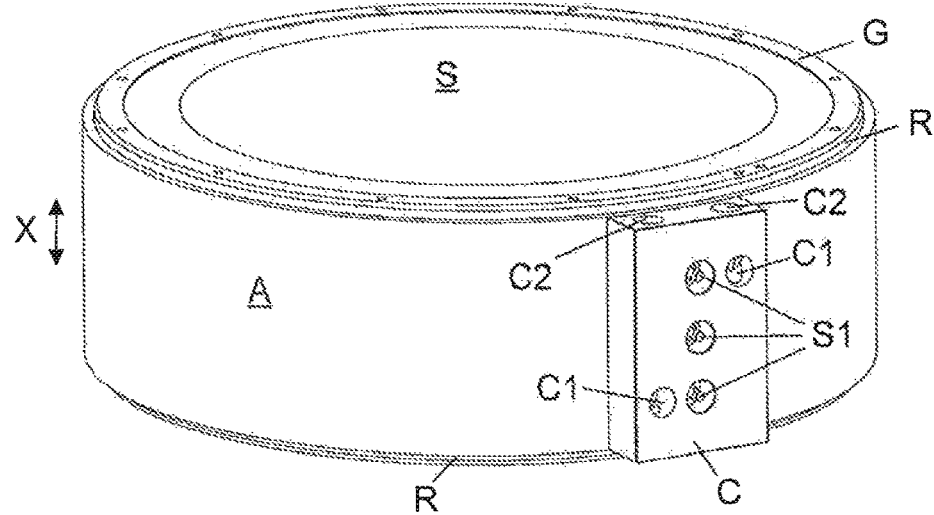
FIG. 9 is a perspective view of the stator having closed-cooling, in the assembled state.

FIGS. 7 to 9 illustrate a further exemplary embodiment, which may lead to cost savings in comparison with the exemplary embodiment described above. Only the differences from the exemplary embodiment illustrated in FIGS. 2 to 4 are described below.

Cover A has no flat or planar region B1 and is therefore easier to manufacture. Instead, connection piece C has a curved region B2 on its side facing cover A, the curvature corresponding to the curvature of cover A. While connection piece C according to the first example embodiment is suitable for any diameter of housing G, connection piece C according to this exemplary embodiment is produced to match the diameter of housing G in each case. In this example embodiment, sections R remain accessible for an installation of the motor. Radially projecting screws S1 are welded to cover A, into which connection piece C is plugged and with the aid of which connection piece C is fixed in place on cover A. Additional openings C3 are not surrounded by a groove but are simply provided with depressions into which suitable O-rings may be placed.

In a further variation, connection piece C may also have threaded holes for the tangential supply of coolant, e.g., in addition to the radial and axial threaded holes C1, C2, or also as a replacement for one of these two supplies, or as the sole supply.

What is claimed is:
1. A cooled housing for a stator of a direct drive, comprising:
an outer peripheral surface including cooling ducts, the cooling ducts being sealed by an annular cover arranged on the peripheral surface;
wherein the cover includes openings arranged as an inlet and outlet for a cooling medium;

wherein sections of the peripheral surface of the housing are not covered by the cover;

wherein the cover is shorter in an axial direction than the peripheral surface of the housing; and wherein the sections include an annular region surrounding the peripheral surface at each end face, the annular regions having a lower surface roughness and a greater dimensional accuracy than a center region, provided with the cooling ducts, of the peripheral surface between the sections, at least one of the annular regions forming a position reference for assembly of the stator and forming a mechanical reference for installation of the direct drive.

2. The cooled housing according to claim 1, wherein the sections have a width of at least 2 mm in an axial direction.

3. The cooled housing according to claim 1, further comprising a seal arranged in groove of the housing on each end face and on both sides of the cooling ducts, between the cover and the housing.

4. The cooled housing according to claim 1, wherein the cover is shrink-fitted onto the housing.

5. The cooled housing according to claim 1, wherein the openings are located at a mutual offset with respect to the peripheral surface in an axial direction and in a tangential direction.

6. The cooled housing according to claim 1, further comprising a connection piece connected to the cover, the connection piece having axial, radial, and/or tangential threaded holes adapted to supply the cooling medium, the threaded holes corresponding to the openings of the cover.

7. The cooled housing according to claim 6, wherein the cover includes a planar region arranged as a contact surface for the connection piece.

8. The cooled housing according to claim 6, wherein the connection piece has a curved region arranged as a contact surface for the cover.

9. The cooled housing according to claim 8, wherein the curved region has a radius of curvature corresponding to a radius of curvature of the peripheral surface of the housing.

10. A direct drive, comprising:
    a stator;
    a rotor arranged interior to the stator; and
    a cooled housing that encloses the stator, the cooled housing including an outer peripheral surface having cooling ducts, the cooling ducts being sealed by an annular cover arranged on the peripheral surface;
    wherein the cover includes openings arranged as an inlet and outlet for a cooling medium;
    wherein sections of the peripheral surface of the housing are not covered by the cover;
    wherein the cover is shorter in an axial direction than the peripheral surface of the housing; and
    wherein the sections include an annular region surrounding the peripheral surface at each end face, the annular regions having a lower surface roughness and a greater dimensional accuracy than a center region, provided with the cooling ducts, of the peripheral surface between the sections, at least one of the annular regions forming a position reference for assembly of the stator and forming a mechanical reference for installation of the direct drive.

11. The direct drive according to claim 10, wherein the sections have a width of at least 2 mm in an axial direction.

12. The direct drive according to claim 10, further comprising a seal arranged in groove of the housing on each end face and on both sides of the cooling ducts, between the cover and the housing.

13. The direct drive according to claim 10, wherein the cover is shrink-fitted onto the housing.

14. The direct drive according to claim 10, wherein the openings are located at a mutual offset with respect to the peripheral surface in an axial direction and in a tangential direction.

15. The direct drive according to claim 10, further comprising a connection piece connected to the cover, the connection piece having axial, radial, and/or tangential threaded holes adapted to supply the cooling medium, the threaded holes corresponding to the openings of the cover.

16. The direct drive according to claim 15, wherein the cover includes a planar region arranged as a contact surface for the connection piece.

17. The direct drive according to claim 15, wherein the connection piece includes a curved region arranged as a contact surface for the cover.

18. The direct drive according to claim 15, wherein the connection piece includes a curved region arranged as a contact surface for the cover, the curved region having a radius of curvature corresponding to a radius of curvature of the peripheral surface of the housing.

19. A cooled housing for a stator of a direct drive, comprising:
    an outer peripheral surface including cooling ducts, the cooling ducts being sealed by an annular cover arranged on the peripheral surface;
    wherein the cover includes openings arranged as an inlet and outlet for a cooling medium;
    wherein sections of the peripheral surface of the housing are not covered by the cover;
    wherein the cover is shorter in an axial direction than the peripheral surface of the housing; and
    wherein the sections include an annular region surrounding the peripheral surface at each end face, the annular regions having a lower surface roughness than a center region, provided with the cooling ducts, of the peripheral surface between the sections.

* * * * *